(12) United States Patent
Wilczynski et al.

(10) Patent No.: US 11,720,609 B2
(45) Date of Patent: Aug. 8, 2023

(54) GRAPH ANALYSIS OF GEO-TEMPORAL INFORMATION

(71) Applicant: Palantir Technologies Inc., Denver, CO (US)

(72) Inventors: Peter Wilczynski, San Francisco, CA (US); Anand Gupta, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/196,042

(22) Filed: Mar. 9, 2021

(65) Prior Publication Data

US 2021/0216575 A1    Jul. 15, 2021

Related U.S. Application Data

(63) Continuation of application No. 16/138,800, filed on Sep. 21, 2018, now Pat. No. 10,942,952.

(60) Provisional application No. 62/764,929, filed on Aug. 16, 2018.

(51) Int. Cl.
| | |
|---|---|
| *G06F 16/29* | (2019.01) |
| *H04W 4/02* | (2018.01) |
| *H04W 4/021* | (2018.01) |
| *G06F 16/248* | (2019.01) |
| *G06F 16/901* | (2019.01) |
| *G06F 16/2457* | (2019.01) |

(52) U.S. Cl.
CPC ............ *G06F 16/29* (2019.01); *G06F 16/248* (2019.01); *G06F 16/24578* (2019.01); *G06F 16/9024* (2019.01); *H04W 4/021* (2013.01); *H04W 4/025* (2013.01)

(58) Field of Classification Search
CPC .. G06F 16/29; G06F 16/24578; G06F 16/248; G06F 16/9024; H04W 4/021; H04W 4/025
USPC ......................................................... 707/724
See application file for complete search history.

(56) References Cited

U.S. PATENT DOCUMENTS

| | | |
|---|---|---|
| 6,642,925 B2 | 11/2003 | Roy et al. |
| 7,133,771 B1 | 11/2006 | Nesbitt |
| 7,849,031 B2 | 12/2010 | Stehle et al. |
| 7,881,861 B2 | 2/2011 | Kravets |
| 8,108,141 B2 | 1/2012 | Ehrlacher |

(Continued)

OTHER PUBLICATIONS

Yu Zheng, Lizhu Zhang, Xing Xie, Wei-Ying Ma; "Mining interesting Locations and Travel Sequences from GPS Trajectories"; 2009; Microsoft Research Asia; 2009.*

(Continued)

*Primary Examiner* — Giovanna B Colan
(74) *Attorney, Agent, or Firm* — Sheppard Mullin Richter & Hampton LLP

(57) ABSTRACT

Systems, methods, and non-transitory computer readable media may be configured to provide graph analysis of geo-temporal information. A location dataset, an entity dataset, and a movement dataset may be accessed. The location dataset may define locations. The entity dataset may define entities. The movement dataset may define movement of the entities among the locations. A graph may be generated based on the location dataset, the entity dataset, and the movement dataset. The graph may represent (1) the locations and the entities with nodes, and (2) the movement of the entities among the locations with edges.

18 Claims, 7 Drawing Sheets

(56) References Cited

U.S. PATENT DOCUMENTS

| | | | |
|---|---|---|---|
| 8,219,540 B2 | 7/2012 | Carter et al. | |
| 8,401,786 B2 | 3/2013 | Poppen et al. | |
| 8,463,295 B1* | 6/2013 | Caralis | G06Q 50/01 705/14.54 |
| 8,463,537 B2 | 6/2013 | Mueller | |
| 8,606,497 B2 | 12/2013 | Doherty et al. | |
| 8,706,407 B2* | 4/2014 | Tuukkanen | G01C 21/3691 701/426 |
| 8,805,707 B2 | 8/2014 | Schumann, Jr. et al. | |
| 9,026,367 B2 | 5/2015 | Paek et al. | |
| 9,253,615 B2 | 2/2016 | Ickman et al. | |
| 9,304,008 B2 | 4/2016 | Poppen et al. | |
| 9,360,335 B1 | 6/2016 | Powelson et al. | |
| 9,547,986 B1 | 1/2017 | Curlander et al. | |
| 9,594,755 B2 | 3/2017 | Majidian | |
| 9,600,146 B2 | 3/2017 | Cervelli et al. | |
| 9,710,212 B2 | 7/2017 | Castelli et al. | |
| 9,767,698 B2 | 9/2017 | Burke et al. | |
| 9,784,589 B1 | 10/2017 | Gyenes et al. | |
| 9,996,229 B2 | 6/2018 | Erenrich et al. | |
| 10,091,299 B2 | 10/2018 | Mian et al. | |
| 10,133,995 B1 | 11/2018 | Reiss | |
| 10,220,705 B2 | 3/2019 | Ramanujam | |
| 10,360,705 B2 | 7/2019 | Cervelli et al. | |
| 10,387,002 B2 | 8/2019 | Spirer | |
| 10,521,475 B2 | 12/2019 | Faith | |
| 2006/0015499 A1 | 1/2006 | Clissold et al. | |
| 2006/0036598 A1* | 2/2006 | Wu | G06F 16/951 707/999.005 |
| 2006/0184314 A1 | 8/2006 | Couckuyt | |
| 2007/0168118 A1 | 7/2007 | Lappe | |
| 2009/0303251 A1 | 12/2009 | Balogh et al. | |
| 2010/0036599 A1 | 2/2010 | Froeberg | |
| 2010/0211308 A1* | 8/2010 | Zheng | G01C 21/20 707/E17.05 |
| 2011/0208425 A1* | 8/2011 | Zheng | G01S 19/14 706/46 |
| 2013/0097246 A1* | 4/2013 | Zifroni | H04W 4/029 709/204 |
| 2014/0108419 A1 | 4/2014 | Udeshi et al. | |
| 2014/0164511 A1* | 6/2014 | Williams | G06Q 50/01 709/204 |
| 2015/0032366 A1 | 1/2015 | Man | |
| 2015/0281250 A1 | 10/2015 | Miller et al. | |
| 2015/0339928 A1 | 11/2015 | Ramanujam | |
| 2016/0063087 A1* | 3/2016 | Berson | G06F 16/24564 707/740 |
| 2016/0069694 A1 | 3/2016 | Tao | |
| 2016/0109251 A1 | 4/2016 | Thakur | |
| 2016/0109252 A1 | 4/2016 | Caine | |
| 2016/0142964 A1 | 5/2016 | Todasco | |
| 2016/0203422 A1* | 7/2016 | Demarchi | G06F 16/29 705/6 |
| 2016/0229404 A1 | 8/2016 | Byun | |
| 2016/0273930 A1 | 9/2016 | Wada | |
| 2016/0298974 A1 | 10/2016 | Newlin | |
| 2016/0298977 A1 | 10/2016 | Newlin | |
| 2016/0334233 A1 | 11/2016 | Baverstock | |
| 2016/0379486 A1 | 12/2016 | Taylor | |
| 2017/0052654 A1 | 2/2017 | Cervelli et al. | |
| 2017/0052655 A1 | 2/2017 | Cervelli et al. | |
| 2017/0146351 A1 | 5/2017 | von Cavallar | |
| 2017/0167882 A1 | 6/2017 | Ulloa Paredes | |
| 2017/0169373 A1 | 6/2017 | Roulland et al. | |
| 2017/0192437 A1 | 7/2017 | Bier | |
| 2017/0262790 A1 | 9/2017 | Khasis | |
| 2017/0268891 A1 | 9/2017 | Dyrnaes | |
| 2017/0276507 A1 | 9/2017 | Zacharenko | |
| 2017/0300049 A1* | 10/2017 | Seally | G08G 1/202 |
| 2017/0314948 A1 | 11/2017 | Racah et al. | |
| 2017/0314949 A1 | 11/2017 | Rovik | |
| 2017/0329569 A1 | 11/2017 | Wilczynski et al. | |
| 2017/0337813 A1 | 11/2017 | Taylor | |
| 2018/0143027 A1 | 5/2018 | Schlesinger | |
| 2018/0143649 A1 | 5/2018 | Miao | |
| 2018/0211541 A1 | 7/2018 | Rakah | |
| 2018/0211546 A1 | 7/2018 | Smartt | |
| 2018/0239763 A1* | 8/2018 | Majumdar | G06F 16/24578 |
| 2018/0259976 A1 | 9/2018 | Williams | |
| 2020/0018844 A1 | 1/2020 | Fridman | |

OTHER PUBLICATIONS

Non-Patent Literature: "Mining interesting Locations and Travel Sequences from GPS Trajectories;" Yu Zheng, Lizhu Zhang; Xing Xie, Wei-Ying Ma; 2009; Microsoft Research Asia; 2009.*

Official Communication for U.S. Appl. No. 15/348,860 dated Dec. 15, 2017.

Official Communication for U.S. Appl. No. 15/666,368 dated Feb. 22, 2018.

Official Communication for U.S. Appl. No. 15/666,368 dated Nov. 16, 2017.

Official Communication for U.S. Appl. No. 15/676,509 dated Feb. 26, 2018.

Official Communication for U.S. Appl. No. 15/676,509 dated Jan. 11, 2019.

Official Communication for U.S. Appl. No. 15/676,509 dated Nov. 16, 2017.

Official Communication for U.S. Appl. No. 15/676,509 dated Sep. 7, 2018.

Official Communication for U.S. Appl. No. 15/826,446 dated Aug. 10, 2018.

Official Communication for U.S. Appl. No. 15/826,446 dated Dec. 10, 2018.

Official Communication for U.S. Appl. No. 15/826,446 dated Jan. 22, 2018.

Yu Zheng, Lizhu Zhang, Xing Xie, Wei-Ying Ma; "Mining Interesting Locations and Travel Sequences from GPS Trajectories"; 2009; Microsoft Research Asia(Year: 2009).

* cited by examiner

Location Dataset 210

| ID | Geographic Position | Type | Address | Relative Location | Parent | Child |
|---|---|---|---|---|---|---|
| 1001 | -------- | ------ | -------- | -------- | -------- | ------ |
| 1002 | -------- | ------ | -------- | -------- | -------- | ------ |
| 1003 | -------- | ------ | -------- | -------- | -------- | ------ |
| 1004 | -------- | ------ | -------- | -------- | -------- | ------ |

FIGURE 2A

| ID | Identity | Type | Weight | Parent | Child |
|---|---|---|---|---|---|
| 2001 | ---- | ---- | ---- | ---- | ---- |
| 2002 | ---- | ---- | ---- | ---- | ---- |
| 2003 | ---- | ---- | ---- | ---- | ---- |
| 2004 | ---- | ---- | ---- | ---- | ---- |

Entity Dataset 220

FIGURE 2B

Movement Dataset 230

| Entity ID | Geographic Position | Time |
|---|---|---|
| 2001 | ------- | Time 1 |
| 2001 | ------- | Time 2 |
| 2001 | ------- | Time 3 |
| 2002 | ------- | Time 3 |
| 2003 | ------- | Time 3 |
| 2004 | ------- | Time 4 |
| 2001 | ------- | Time 4 |
| 2002 | ------- | Time 4 |
| 2003 | ------- | Time 4 |

Movement Dataset 240

| Entity ID | Location ID | Time |
|---|---|---|
| 2001 | 1001 | Time 1 |
| 2001 | 1001 | Time 2 |
| 2001 | 1002 | Time 3 |
| 2002 | 1002 | Time 3 |
| 2003 | 1002 | Time 3 |
| 2004 | 1004 | Time 4 |
| 2001 | 1001 | Time 4 |
| 2002 | 1004 | Time 4 |
| 2003 | 1003 | Time 4 |

FIGURE 2C

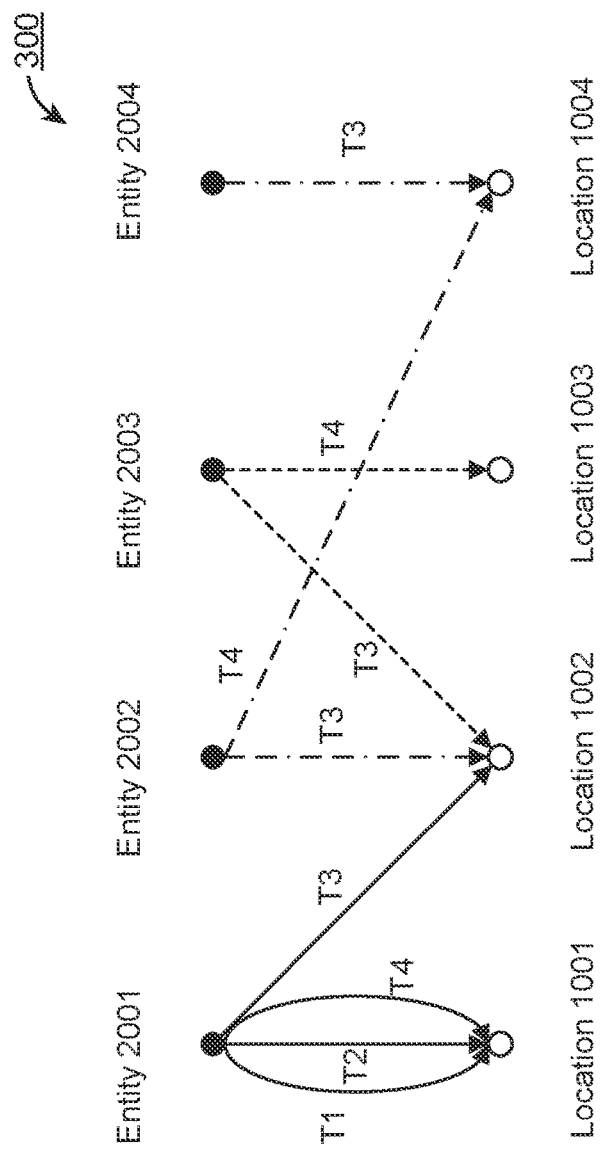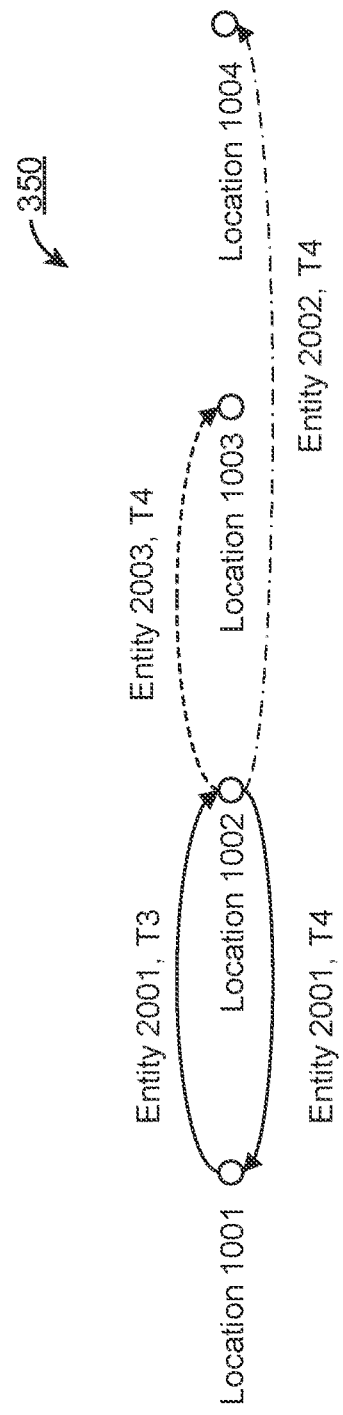
FIGURE 3A
FIGURE 3B

GRAPH ANALYSIS OF GEO-TEMPORAL INFORMATION

CROSS REFERENCE TO RELATED APPLICATIONS

This application is continuation of U.S. application Ser. No. 16/138,800 filed Sep. 21, 2018, now U.S. Pat. No. 10,942,952, issued Mar. 9, 2021, which claims the benefit under 35 U.S.C. § 119(e) of U.S. Provisional Application No. 62/764,929, filed Aug. 16, 2018, the content of each is incorporated by reference in its entirety into the present disclosure.

FIELD OF THE INVENTION

This disclosure relates to approaches for using graph representations of geo-temporal information.

BACKGROUND

Under conventional approaches, geo-temporal information may be processed using geographic information system (GIS) tools. Such tools may be process intensive and may not scale effectively.

SUMMARY

Various embodiments of the present disclosure may include systems, methods, and non-transitory computer readable media configured to provide graph analysis of geo-temporal information. A location dataset may be accessed. The location dataset may define locations. An entity dataset may be accessed. The entity dataset may define entities. A movement dataset may be accessed. The movement dataset may define movement of the entities among the locations. A graph may be generated based on the location dataset, the entity dataset, and the movement dataset. The graph may represent (1) the locations and the entities with nodes, and (2) the movement of the entities among the locations with edges.

In some embodiments, the locations may include points of interest. The points of interest may include buildings. The locations may be arranged within a hierarchy of locations.

In some embodiments, the entities may include a person, a team, or an organization. The entities may be arranged within a hierarchy of entities.

In some embodiments, the graph may be analyzed using a graph-based algorithm. The graph-based algorithm may facilitate analysis of information within the location dataset, the entity dataset, and the movement dataset using a non-geospatial algorithm. For example, the graph-based algorithm may include a ranking algorithm. The ranking algorithm may rank the locations based on the nodes and the edges within the graph.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2A illustrates an example location dataset, in accordance with various embodiments.

FIG. 2B illustrates an example entity dataset, in accordance with various embodiments.

FIG. 2C illustrates example movement datasets, in accordance with various embodiments.

FIG. 3A illustrates an example graph of entities and locations, in accordance with various embodiments.

FIG. 3B illustrates an example graph of locations, in accordance with various embodiments.

DETAILED DESCRIPTION

Figure 1:
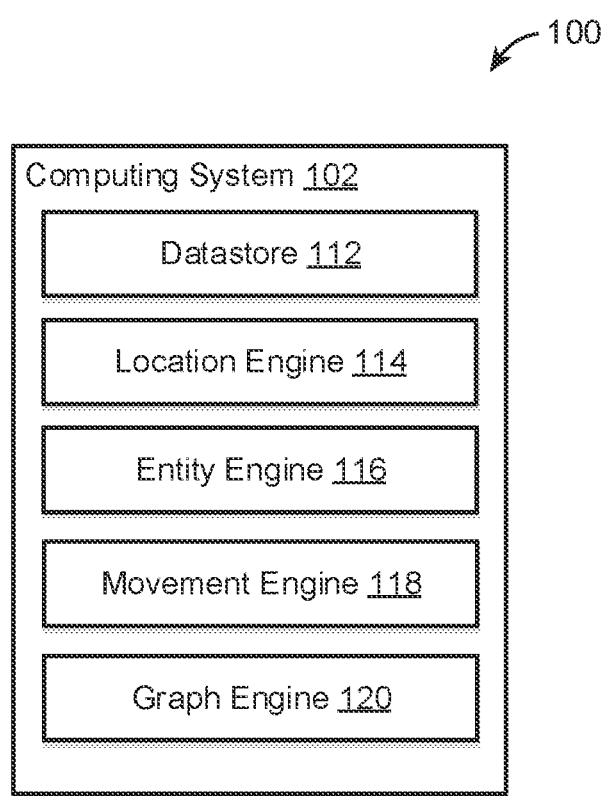
FIG. 1 illustrates an example environment for providing graph analysis of geo-temporal information, in accordance with various embodiments.

A claimed solution rooted in computer technology overcomes problems specifically arising in the realm of computer technology. A location dataset, an entity dataset, and a movement dataset may be accessed. The location dataset may define locations. The entity dataset may define entities. The movement dataset may define movement of the entities among the locations. A graph may be generated based on the location dataset, the entity dataset, and the movement dataset. The graph may represent (1) the locations and the entities using nodes and (2) the movement of the entities among the locations using edges.

In some embodiments, the locations may include points of interest, such as buildings, portions of buildings (e.g., particular rooms), geographic areas, cities, states, and/or countries. The locations may be arranged within a hierarchy of locations. For example, a state may have multiple cities, a city may have multiple buildings, and a building may have multiple rooms.

The entities may move to and/or from locations, such as to and/or from points of interest. In some embodiments, the entities may include a person, a team (or group of individuals), or an organization. The entities may be arranged within a hierarchy of entities. For example, an organization may include multiple teams, and a team may include multiple persons. Certain entities may be more important than others for generation and/or analysis of the graph. For example, movements of a high-ranking officer in an organization may be considered more informative than movements of lower-ranked individuals. Accordingly, in some embodiments, certain entities may be weighed more heavily than other entities when analyzing movement of the entities among the locations.

In some embodiments, the graph may be analyzed using a graph-based algorithm. The graph-based algorithm may facilitate analysis of information within the location dataset, the entity dataset, and the movement dataset using a non-geospatial algorithm. For example, the graph-based algorithm may include a ranking algorithm. The ranking algorithm may rank the locations based on the nodes and the edges within the graph (e.g., Google PageRank).

The approaches disclosed herein facilitate graph analysis of geo-temporal information. Graph analysis of geo-temporal information may include a shift from a geospatial and continuous view of data into a discretized topographical view of the data. For example, geospatial information within the data may be transformed into a non-geospatial label space for graph analysis. Such a change in treatment of data may enable discovery of relationships among entities and/or locations as represented using nodes and edges within a graph, and enable use of less process-intensive tools to analyze geo-temporal information.

While the disclosure is described herein with respect to generation and analysis of a graph based on movement of entities among locations, this is merely for illustrative purposes and is not meant to be limiting. The approaches disclosed herein may be used to generate and analyze a graph based on other connections between entities and locations, other connections between entities, and/or other connections between locations. For example, a graph in which entities are represented as nodes and in which respective contacts between the entities (e.g., personal contact, email correspondence, telephone call) are represented as edges may be generated and analyzed using the approaches disclosed herein. Graphs including nodes and/or edges that correspond to other representations are contemplated.

FIG. 1 illustrates an example environment 100 for providing graph analysis of geo-temporal information, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a location engine 114, an entity engine 116, a movement engine 118, a graph engine 120, and/or other engines/components. The datastore 112 may include structured and/or unstructured sets of data that can be divided/extracted for provisioning when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple, distributed computing devices and/or systems.

In various embodiments, the location engine 114 may be configured to access one or more location datasets. Accessing a location dataset may include acquiring, analyzing, determining, examining, identifying, loading, locating, obtaining, opening, receiving, retrieving, reviewing, storing, using, and/or otherwise accessing the location dataset. A location dataset may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). A location dataset accessed by the location engine 114 may be stored within the datastore 112 and/or other locations. A location dataset may refer to a collection of data relating to one or more geographic locations. A location dataset may be stored in one or more databases, one or more tables, one or more objects, and/or in other data structures. A location dataset may define one or more locations. A location may refer to a particular place or a position. A location may include one or more points, one or more areas, and/or one or more volumes in space. A location may include a single continuous area/volume or separate areas/volumes. A location may include a point of interest. A point of interest may refer to a specific location that may be of use or interest. For example, a location may include one or more of a building, a portion of a building (e.g., a particular room), a geographic area, a city, a state, and/or a country. Other types of locations are contemplated. In some embodiments, locations may be arranged within a hierarchy of locations. A hierarchy of locations may refer to an organization or a structure of locations in which the locations are ranked above and/or below others. A location that is above other location(s) may be referred to as a parent of the other location(s). A location that is below another location may be referred to as a child of the other location. A parent location may include one or more child locations. For instance, locations may include countries, states within individual countries, cities within individual states, buildings within individual cities, rooms within individual buildings, and/or particular positions (e.g., desk, stations) within individual rooms. Other locations and other hierarchies of locations are contemplated. The location dataset may define one or more locations. For example, the location dataset may define a location by determining and storing a location identifier for the location. In another example, the location dataset may define a location by determining and storing geographic position information for the location. In yet another example, the location dataset may define a location by determining and storing information describing a type of the location. In another example, the location dataset may define a location by determining and storing address information for the location. In yet another example, the location dataset may define a location by determining and storing relative location information for the location. In a further example, the location dataset may define a location by determining and storing information describing any parent(s) and/or child(s) for the location.

In various embodiments, the entity engine 116 may be configured to access one or more entity datasets. Accessing an entity dataset may include acquiring, analyzing, determining, examining, identifying, loading, locating, obtaining, opening, receiving, retrieving, reviewing, storing, using, and/or otherwise accessing the entity dataset. An entity dataset may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). An entity dataset accessed by the entity engine 116 may be stored within the datastore 112 and/or other locations. An entity dataset may refer to a collection of data relating to one or more entities. An entity dataset may be stored in one or more databases, one or more tables, one or more objects, and/or in other data structures. An entity dataset may define one or more entities. An entity may refer to a thing that has a separate and distinct existence. An entity may include a living thing and/or a non-living thing. An entity may include a physical thing and/or a virtual thing. For example, an entity may refer to a person, team of persons, a thing, a group of things, and/or an organization. Other types of entities are contemplated. Entities may move to and/or from locations. For example, one or more entities may move to and/or from points of interest. One or more entities may move between locations at the same time or at different times. The movement of the entities among different locations may be analyzed within a graph to determine information about the entities and/or the locations, such as the relationships among entities and/or locations, or the importance of locations among entities. In some embodiments, entities may be arranged within a hierarchy of entities. A hierarchy of entities may refer to an organization or a structure of entities in which the entities are ranked in relation to one another (e.g., above and/or below one another). An entity that is above other entit(ies) may be referred to as a parent of the other entit(ies). An entity that is below another entity may be referred to as a child of the other entity. A parent entity may include one or more child entities. For instance, an organization may include one or more teams, and individual teams may include one or more persons. A child entity may be associated with one or more parent entities. For instance, a team may include persons from a single organization or from multiple organizations. Certain entities may be more important than others for generation and/or analysis of graphs of entities and locations. For instance, certain entities may be weighed more heavily than other entities when analyzing movement of the entities among the locations. Other entities, other hierarchies of entities, and weights of entities are contemplated. The entity dataset may define one or more entities by determining and storing information regarding the entities. For example, the entity dataset may define an entity by associating the entity with an entity identifier, including information describing a type of the entity, including weighting information of the entity, including information of parent(s) and/or child(s) associated with the entity, and/or including other information regarding the entity.

In various embodiments, the movement engine 118 may be configured to access one or more movement datasets. Accessing a movement dataset may include acquiring, analyzing, determining, examining, identifying, loading, locating, obtaining, opening, receiving, retrieving, reviewing, storing, using, and/or otherwise accessing the movement dataset. A movement dataset may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). A movement dataset accessed by the movement engine 118 may be stored within the datastore 112 and/or other locations. A movement dataset may refer to a collection of data relating to movement of one or more entities. A movement dataset may be stored in one or more databases, one or more tables, one or more objects, and/or in other data structures. A movement dataset may define movement of one or more entities (e.g., as defined by an entity dataset) among one or more locations (e.g., as defined by a location dataset). For example, the movement dataset may define movement of entities among locations by determining and storing geographic location information of different entities at various times, information indicating whether the entities were present at locations defined by a location dataset at various times, information identifying locations at which the entities were present at various times, and/or other information regarding the movement of entities. In some embodiments, the movement engine 118 may be configured to determine whether the entities were present at locations at various times and/or at which locations the entities were present at various times. For example, the location dataset may define a geographic location of a given location using geographic positioning information (e.g., latitude and longitude; latitude, longitude, and altitude; physical address, a two-dimensional boundary (or bounding shape); three-dimensional boundary) of the location, and the movement dataset may define geographic positions of an entity using geographic position information (e.g., latitude and longitude; latitude, longitude, and altitude; address) of the entity. The movement engine 118 may determine whether the entity was present at the location at various times by determining whether the geographic position of entity at various times corresponds to (e.g., matches, is the same as, is within) the geographic position of the location. Additionally, the movement dataset may be generated from stationary sensors which observe the movement of entities (e.g., badge readers, credit card transactions). If the sensors are associated with a stationary location, a movement dataset may be generated from previously non-geospatial data. The movement engine 118 may generate a movement dataset with the determined information and/or augment an existing movement dataset with the determined information. Thus, multiple movement datasets may be combined into a fused dataset for analysis.

In some embodiments, the location dataset accessed by the location engine 114, the entity dataset accessed by the entity engine 116, and/or the movement dataset accessed by the movement engine 118 may be stored in a single database or in multiple databases. The location dataset accessed by the location engine 114, the entity dataset accessed by the entity engine 116, and/or the movement dataset accessed by the movement engine 118 may be stored in a single table or in multiple tables. The location dataset accessed by the location engine 114, the entity dataset accessed by the entity engine 116, and/or the movement dataset accessed by the movement engine 118 may be stored in a single object or in multiple objects. Many variations are possible.

In various embodiments, the graph engine 120 may be configured to generate one or more graphs, for example, based on the location dataset, the entity dataset, the movement dataset, and/or other information. A graph generated by the graph engine 120 may represent (1) the locations and the entities as nodes, and (2) the movement of the entities among the locations as edges. The graph may provide a discretized and topographical view of the data contained within one or more of the datasets. For example, rather than viewing different locations on a map, the locations may be viewed as nodes within the graph. As another example, rather than viewing different routes taken by entities to move among the locations, the movement of entities among the locations may be viewed as edges within the graph. The continuous geospatial information within the datasets may be transformed into a discretized, non-geospatial label space for graph analysis.

In general, transforming a continuous stream of geospatial information (e.g., positions of entities at different times) into a graph may provide for compression of the information. For example, large amount of geo-temporal information that indicates locations of entities at different times may be compressed into a graph that represents information on movements of the entities among particular locations. For instance, the portions of the geo-temporal information that are not needed to determine which points of interest were visited by which entities, such as information on positions of entities between points of interest, may be removed (or filtered). Similarly, the portions of the geo-temporal information that are not needed for analysis may be removed. For instance, visits by an entity to a home location may be removed from the graph and/or removed before generating the graph if movement of the entity to and/or from the home location is not relevant. The graph may be used to for myriad applications including, for example, indexing and/or querying various information (e.g., movement information).

In some embodiments, the graph may be presented within or through an interface (e.g., user interface, application programming interface). The graph may be presented to users for analysis and/or interaction. In some embodiments, nodes and/or edges of the graph may be presently differently to provide different information regarding the corresponding entities, locations, and/or movements of entities. For example, nodes representing entities of a particular organization may be presented using different visual elements (e.g., colors, shapes, etc.) than entities of a different organization. As another example, nodes representing entities corresponding to different rank within a hierarchy of entities may be presented using different visual elements. As yet another example, nodes representing locations of different types (e.g., private residence, business location, government building, work location, sleeping location) may be presented using different visual elements. Similarly, edges representing different movement of entities, such as different lengths of movement, different distances of movements, different modes of movement, may be presented using different visual elements (e.g., colors, different line types, different thickness, etc.).

The graph representation of the locations, the entities, and/or the movement of the entities among the locations may enable graph analysis of the locations and the entities. For example, relationships among the entities and/or the locations may be discovered based on analysis of edges that connect the different nodes of entities and locations within the graph. Analysis of the graph may be performed using one or more graph-based algorithms. A graph-based algorithm may refer to a process or a set of rules that takes advantage of graph characteristics for performing calculations. That is, a graph-based algorithm may include an algorithm that analyzes information contained within the graph based on nodes within the graph and edges between the nodes. A graph-based algorithm may facilitate analysis of information within the location dataset, the entity dataset, and the movement dataset using a non-geospatial algorithm. A graph-based algorithm may scale more effective, may be less process-intensive, and/or may be more parallelizable than geospatial algorithms, such as geographic information system (GIS) algorithms.

The graph may be analyzed to perform one or more searches for particular information. That is, various particular information (e.g., connection between nodes, characteristics of nodes/edges), may be found using a search algorithm. For instance, the graph may be analyzed to identify edges connecting to one or more location nodes to perform a search for all entities that visited the location(s). The graph may be analyzed to identify edges connecting to one or more entity nodes to perform a search for all locations visited by the entit(ies). The graph may be analyzed to identify entity nodes connected to a combination of location nodes and/or to identify location nodes connected to a combination of entity nodes. The graph may be analyzed to identify entity nodes not connected to one or more particular location nodes and/or locations not connected to one or more particular entity nodes. Other types of searches on the graph based on nodes and/or edges are contemplated. The searching of the graph may be filtered based on one or more criteria. For example, the searching of the graph may be filtered based on time. For instance, the nodes and/or edges within the graph may change based on the range of time represented by the graph, and the nodes and/or edges may be filtered from the graph by changing the range of time represented by the graph.

The graph may be analyzed to determine characteristics of visits of entities to different locations. That is, one or more characteristics of nodes and/or edges may be determined using a characteristic-determination algorithm. For instance, information such as whether entities were present at certain location, when entities were present at certain locations, and/or how often entities were present at certain locations may be determined based on edges between the entity nodes and location nodes. Such visitation characteristics of entities may be used to group entities together based on visitation patterns and/or visitation habits.

The graph may be analyzed to determine the relative importance of different locations and/or the relative importance of different entities. That is, a ranking algorithm may be used to rank the locations and/or entities based on the nodes and the edges within the graph. For instance, the number and/or types of edges that connect to different location nodes may be used to rank the relative importance of the different locations. Similarly, the number and/or types of edges that connect to different entities nodes may be used to rank the relative importance of the different entities. In some embodiments, a respective ranking for a location or entity may be determined based on a respective number of edges connecting to the location or entity. That is, every edge connecting to a node may add some weight to the node. Different nodes within the graph may be associated with different weights. That is, an edge connection to a high-weight node may add a larger weight to the connected node than an edge connected to a low-weight node.

The topographic visitation information provided by the edges among nodes may allow for ranking of locations and/or entities. Certain entities and/or locations may be more important than others for generation and/or analysis of the graph. For example, certain entities may be weighed more heavily than other entities when analyzing movement of the entities among the locations. For instance, a visit to a store location by a valued customer and/or a top-management personnel in the store's organization may be weighed more heavily than a visit to the store location by a regular customer/window shopper and/or a non-management personnel. In some embodiments, the ranking of locations and/or entities may be changed dynamically. For example, a weight applied to a location node based on a visit by a particular entity may be modified by changing the weight associated with the particular entity. As another example, a weight added to a location node based on a visit by a particular entity may be modified by changing the position of the entity within a hierarchy of entities. The reweighing of different nodes and/or edges may allow users to refine the accuracy and/or results of the ranking.

In some embodiments, the ranking of locations and/or entities may be used to change the manner in which the locations and/or entities are identified. For example, a search result for a company may include multiple locations of the company, and the locations of the company may be listed in order ranking.

In various embodiments, the graph may be analyzed to determine grouping of entities and/or locations. That is, a grouping algorithm may be used to determine groups of entities and/or nodes. For instance, entities belonging to an entity group may be associated with a pattern of movement among particular locations. That is, a member of a particular group may be known to visit one or more particular locations (e.g., at certain times, a number of times, with a certain frequency, from a certain location). Based on the edges between the entity nodes and the locations nodes, the membership of an entity (e.g., person) in a particular entity group (e.g., organization) may be determined.

In various embodiments, the graph may be analyzed to determine connections between different entities. That is, a connection-determination algorithm may be used to determine connections between node entities. For instance, edges between entity nodes and location nodes may indicate that entit(ies) belonging to an entity group are visiting location(s) associated with another entity and/or another entity group. Based on the pattern of the entit(ies) visiting the location of another entity/entity group, a connection between the different entities/entity groups, such as a familial relationship and/or a business relationship, may be determined.

In various embodiments, the graph may be analyzed to determine changes in entities and/or relationships between entities. That is, a change-determination algorithm may be used to determine changes in patterns of nodes and edges. For instance, changes in edges (e.g., number of edges, types of edges, etc.) between entity nodes and location nodes over time may indicate that the position/responsibility of the entity has changed (e.g., a person's job responsibility has changed to require the person to visit different locations). Changes in edges between entity nodes and location nodes over time may indicate that the entity has changed membership in an entity group (e.g., a person is going to work in different places because of a change in job or a change in team). Changes in edges between entity nodes and location nodes over time may indicate that an entity/entity group has formed (or broken) a connection to another entity/entity group (e.g., a person working for a company starts/stops going to a location associated with another person/company). Similarly, patterns of changes in edges between entity nodes and location nodes over time may indicate that an entity may change membership in an entity group in the future and/or that an entity/entity group will form (or will break) a connection to another entity/entity group.

In various embodiments, the graph may be analyzed to identify a new location of interest. That is, a node-determination algorithm may be used to identify a particular node within the graph and/or determine information about a node. For instance, a particular type of location, such as a coffee shop, may be associated with a particular type of visitation pattern, such as visits from certain entities, visits from certain types of entities, and/or visits at certain times. The graph may be analyzed to find the corresponding pattern among the edges between the entity nodes and the location nodes to determine a new location for the coffee shop.

In various embodiments, the graph may be analyzed to determine which entit(ies) and/or location(s) may be critical in relationships between entities. That is, a relationship algorithm may be used to find links between different nodes. For example, edges between an entity node representing a person belonging to an organization and a location node associated with another organization may indicate that the person serves as a link between the two organizations. For instance, the person may be the point person for interaction between the two organizations and/or may be mediating a relationship between the two organizations. Alternatively, edges between the entity node and the location node may indicate that the person is planning on switching organizations.

In various embodiments, the graph may be analyzed to identify deviations in known visitation patterns. That is, a deviation algorithm may be used to find deviations from baseline patterns among nodes and/or edges. For example, a group of entities and/or a certain type of entities may be known to visit one or more locations in accordance with a particular visitation pattern. One or more deviations from this visitation pattern may be identified among the group of entities and/or the type of entities to determine changes in visitation behavior for one or more of the entities. Such changes may be analyzed to determine the source and/or the cause of the changes in the visitation behavior.

In some embodiments, the analysis of the graph may include analysis of information other than nodes representing entities/locations and edges representing movement of the entities among the locations. For example, actions of different entities at locations may be taken into consideration when generating and/or analyzing the graph. For instance, non-geospatial information may be taken into account when generating and/or analyzing the graph. Such fusion of non-geospatial information with geo-spatial information for purposes of generating and/or analyzing the graph may provide for different and/or more comprehensive types of analyses. For example, visits of persons to store locations may be of interest to users (e.g., store owners, retailers, advertisers). Weighing visits of different persons to store locations differently based on what the persons did at the store location may provide for a different analysis. For instance, visits to a store location in which a person purchased a product (e.g., an determined by an edge between a location node representing the store location and an entity node representing the person) may be upweighted. Such upweighting of edges may enable the graph analysis to provide information on not just how many visits may have been made at the store location, but information on how many of the visits resulted in some conversion (e.g., a sale). Thus, in addition to converting continuous stream of geospatial information into discrete nodes and edges, in some embodiments, non-geospatial information may be used to enrich the graph and/or increase granularity of information provided by the graph.

In some embodiments, one or more nodes and/or edges within a graph may be clustered together. For example, a graph including numerous location nodes (e.g., hundreds or thousands of location nodes) may be difficult to understand from visual inspection. The location nodes may be clustered together based on one or more common characteristics. For example, location nodes corresponding to different locations of an organization may be grouped into a single location node. Such clustering of multiple location nodes into a single location node may result in edges between entity nodes and the location nodes of an organization being changed into edges between the entities nodes and the single location node of the organization. As another example, entity nodes corresponding to different persons of an organization may be grouped into a single entity node. Such clustering of multiple entity nodes into a single entity node may result in edges between locations nodes and the entity nodes of an organization being changed into edges between the location nodes and the single entity node of the organization. Similarly, both location nodes and entities nodes may be clustered together.

In various embodiments, clustering of nodes and/or edges may provide for aggregation of movement information between the entities and the locations. In some embodiments, clustering of nodes and/or edges may provide for changes in the level of granularity of information provided by the graph and/or analysis of the graph. For example, the clustering of nodes and/or edges may be performed to change the analysis from individual persons visiting individual locations to an organization (to which the persons belong) being connected to other organizations (to which the locations are associated). Other changes in granularity of the graph are contemplated.

FIG. 2A illustrates an example location dataset 210, in accordance with various embodiments. The location dataset 210 may define one or more locations by including information describing the locations. For example, the location dataset 210 may include, for four different locations, information describing location identifiers of the locations, information describing geographic positions (e.g., latitude, longitude, altitude, two-dimensional boundary, three-dimensional boundary) of locations, information describing types of the locations, information describing physical addresses of the locations, information describing relative locations of the locations (e.g., relative location of a room within a building), information describing parent(s) associated with the locations, information describing children associated with the locations, and/or other information regarding the locations. Other types of location datasets are contemplated.

FIG. 2B illustrates an example entity dataset 220, in accordance with various embodiments. The entity dataset 220 may define one or more entities by including information describing the entities. For example, the entity dataset 220 may include, for four different entities, information describing entity identifiers for the entities, information describing types of the entities, information describing weights of the entities, information describing parent(s) associated with the entities, information describing children associated with the entities, and/or other information regarding the entities. Other types of entity dataset are contemplated.

FIG. 2C illustrates example movement datasets 230, 240, in accordance with various embodiments. The movement dataset 230 may define movement of one or more entities (e.g., defined by the entity dataset 220) among one or more locations (e.g., defined by the location dataset 210). The movement dataset 230 may define movement of one or more entities by including information regarding positions of the entit(ies) at various times. For example, the movement dataset 230 may include information on geographic positions of entities (e.g., latitude and longitude; latitude, longitude, and altitude) at various times. In some embodiments, whether the entities are located at one or more locations (e.g., defined by the location dataset 210) at various times may be determined by matching the geographic positions of the entities with the geographic positions of the locations (e.g., defined by the location dataset 210).

The movement dataset 240 may define movement of one or more entities (e.g., defined by the entity dataset 220) among one or more locations (e.g., defined by the location dataset 210). The movement dataset 240 may define movement of one or more entities by including information describing the location identifiers corresponding to the locations at which the entities were present at various times. The presence of the entities at the different locations may be determined, for example, by matching of the geographic positions of the entities (e.g., defined by the movement dataset 230) with the geographic positions of the locations (e.g., defined by the location dataset 210). Other types of movement datasets are contemplated.

FIG. 3A illustrates an example graph 300 of entities and locations, in accordance with various embodiments. The graph 300 may represent four locations (locations 1001, 1002, 1003, 1004) and four entities (entities 2001, 2002, 2003, 2004) with nodes and movements of the entities among the locations with edges between the nodes. The edges between the nodes may be associated with timing information that indicates when the movement took place. For example, at time T1, the entity 2001 may have visited the location 1001. At time T2, the entity 2001 may have visited the location 1001 again (e.g., after having moved to another location from the location 1001). At time T3, the entity 2001, the entity 2002, and the entity 2003 may have visited the location 1002 while the entity 2004 may have visited the location 1004. At time T4, the entity 2001 may have visited the location 1001, the entity 2002 may have visited the location 1004, and the entity 2003 may have visited the location 1003.

The graph representation of the locations 1001, 1002, 1003, 1004, the entities 2001, 2002, 2003, 2004, and/or the movement of the entities 2001, 2002, 2003, 2004 among the locations 1001, 1002, 1003, 1004 may enable graph analysis of the locations and the entities. Analysis of the graph 300 may be performed using one or more graph-based algorithms. For example, based on the repeated trip of the entity 2001 to the location 1001, it may be determined that the entity 2001 has a connection to the location 1001 and/or an entity associated with the location 1001. As another example, based on the entities 2001, 2002, 2003, 2004 visiting the location 1002 at time T3, it may be determined that some event of significance for the entities 2001, 2002, 2003, 2004 may have occurred at the location 1002 at or near time T3. As yet another example, based on the entities 2003, 2004 traveling to different locations at time T4, it may be determined that the entity 2002 has a connection to the location 1004 while the entity 2003 has a connection to the location 1003. Other types of analyses of the graph 300 are contemplated.

FIG. 3B illustrates an example graph 350 of locations, in accordance with various embodiments. The graph 350 may represent four locations (locations 1001, 1002, 1003, 1004). Movement of four entities (entities 2001, 2002, 2003, 2004) among the locations may be represented with edges between the location nodes. For example, the graph 350 may represent movement of the entities 2001, 2002, 2003, 2004 among the locations 1001, 1002, 1003, 1004 at times T3 and T4, as shown in the graph 300. The movements of the entity 2001 at time T3 from the location 1001 to the location 1002 may be represented by an edge between the location nodes representing the locations 1001, 1002. Although the entities 2002, 2003 also moved to the location 1002 at time T3, their movement may not be represented by an edge in the graph 360 because the entities 2002, 2003 did not move to the location 1002 from a defined location. That is, the first location defined by a location dataset that the entities 2002, 2003 first traveled to may be the location 1002.

The movement of the entity 2001 at time T4 from the location 1002 to the location 1001 may be represented by an edge between the location nodes representing the locations 1001, 1002 (going in the opposite direction than the edge at time T3). The movement of the entity 2002 at time T4 from the location 1002 to the location 1004 may be represented by an edge between the location nodes representing the locations 1002, 1004. The movement of the entity 2003 at time T4 from the location 1002 to the location 1003 may be represented by an edge between the location nodes representing the locations 1002, 1003.

The graph representation of the locations 1001, 1002, 1003, 1004, and/or the movement of the entities 2001, 2002, 2003, 2004 among the locations 1001, 1002, 1003, 1004 may enable graph analysis of the locations and the entities. Analysis of the graph 350 may be performed using one or more graph-based algorithms. For example, based on the location 1002 having more edges than the locations 1001, 1003, 1004, the location 1002 may be ranked higher than the location 1001, 1003, 1004. As another example, based on the locations 1001, 1002 being connected by two edges, the locations 1002, 1003 being connected by a single edge, and the locations 1003, 1004 being connected by a single edge, the location 1001 may be ranked higher than locations 1003, 1004. Other analysis of the graph 350 are contemplated.

Figure 4:
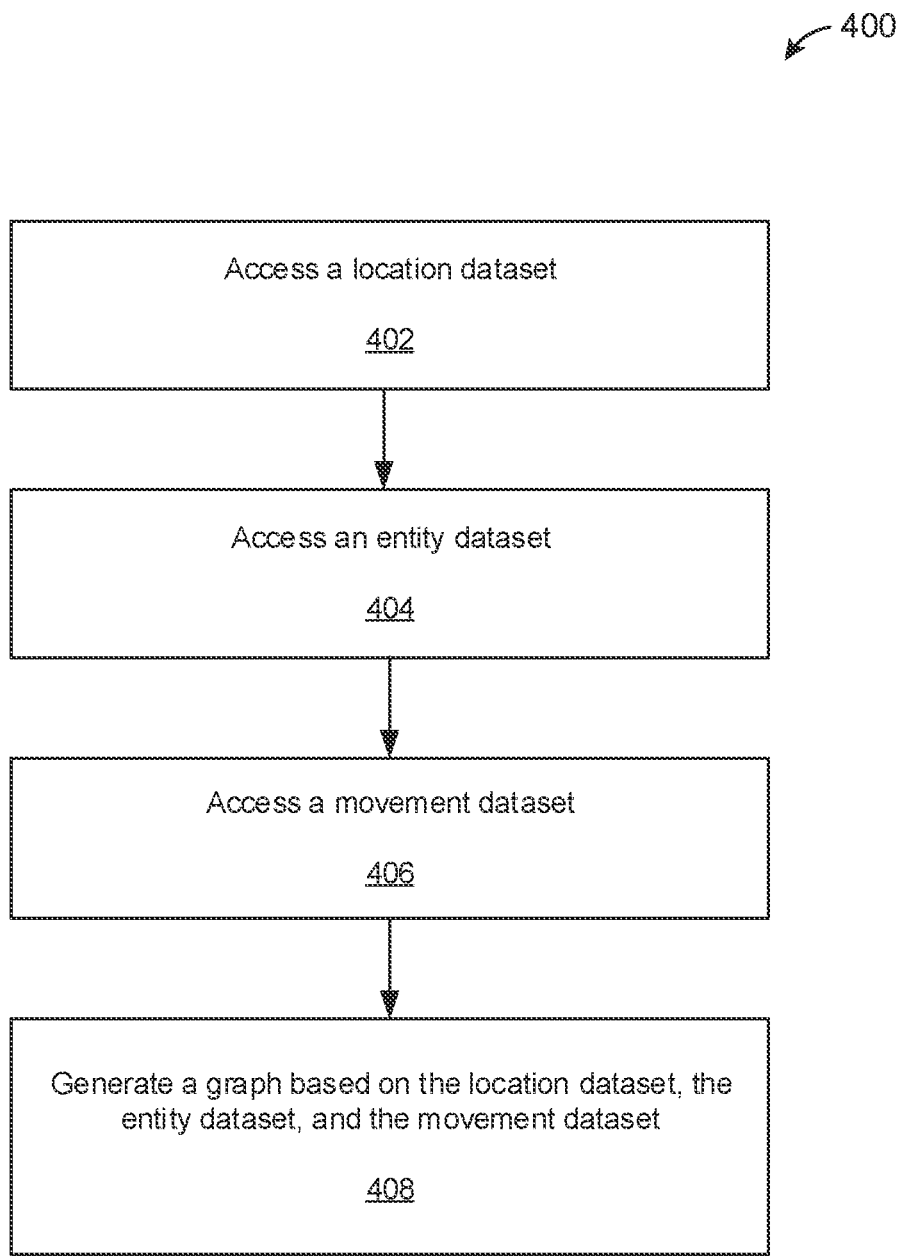
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a location dataset may be accessed. The location dataset may define locations. At block 404, an entity dataset may be accessed. The entity dataset may define entities. At block 406, a movement dataset may be accessed. The movement dataset may define movement of the entities among the locations. At block 408, a graph may be generated based on the location dataset, the entity dataset, and the movement dataset. The graph may represent (1) the locations and the entities with nodes, and (2) the movement of the entities among the locations with edges.

HARDWARE IMPLEMENTATION

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
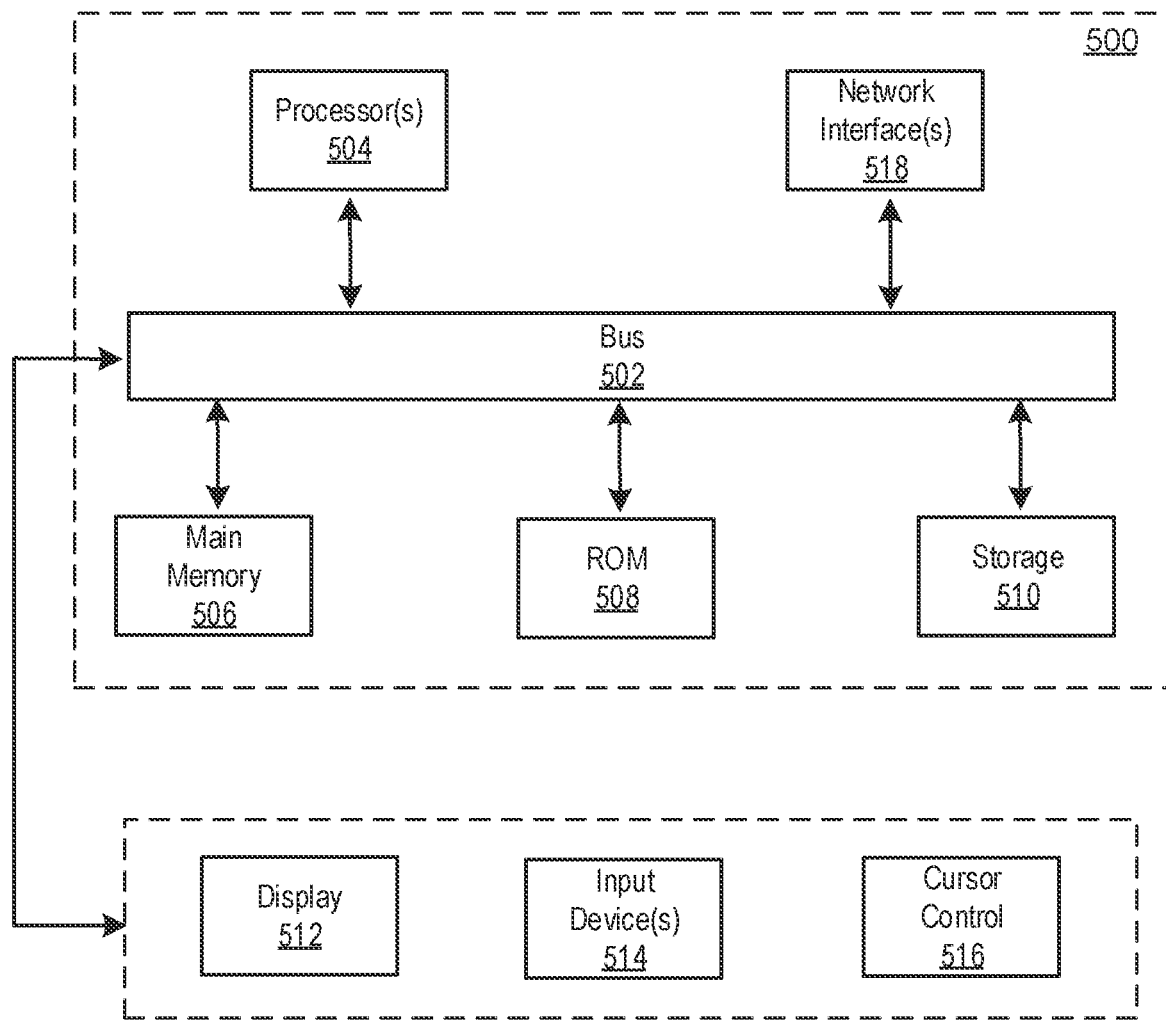
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a high-scale time series database, relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   a memory storing instructions that, when executed by the one or more processors, cause the system to perform:
      generating one or more datasets from geospatial data comprising a continuous stream of geospatial information;
      based on the one or more datasets, generating a discretized topological graph comprising:
         location nodes indicating locations,
         entity nodes indicating entities, and
         edges between the location nodes and the entity nodes,
      determining respective first weights associated with a portion of the entities based on one or more types of the edges that are connected to each of the entity nodes corresponding to the portion of the entities;
      determining respective second weights associated with a portion of the locations based on one or more types of the edges that are connected to each of the location nodes corresponding to the portion of the locations;
      based on non-geospatial information, changing a first weight of the first weights or receiving a change to the first weight corresponding to a first entity of the entities, wherein the first entity visits a location having a second weight, and the non-geospatial information comprises an increase or decrease in an authority level or a change in a designation of the first entity;
      reevaluating the second weight corresponding to the location based on the changed first weight, wherein, in response to the changed first weight being higher than the first weight, the reevaluated second weight is higher compared to the second weight; and
      ranking the entities or the locations based on the changed first weight or the reevaluated second weight.

2. The system of claim 1, wherein the first weights are associated with positions of the entities within an entity hierarchy.

3. The system of claim 1, wherein the second weights are further determined based on a total number of the edges connected to the location nodes corresponding to the locations over particular time intervals.

4. The system of claim 1, wherein the locations correspond to at least one of buildings, levels within a building, or rooms within a level.

5. The system of claim 4, wherein the locations correspond to the buildings and movements associated with the entities are based on movement data generated from stationary sensors associated with the buildings.

6. The system of claim 5, wherein the movements associated with the entities are based on movement data generated from transaction data associated with the businesses.

7. The system of claim 1, wherein the entity nodes and the location nodes of the discretized topological graph are generated based on an entity dataset and a location dataset, respectively.

8. The system of claim 1, wherein the discretized topographical graph is based on a transformation of geo-temporal information of a geospatial map into a non-geospatial label space.

9. The system of claim 1, wherein the instructions, when executed, cause the system to further perform:
   providing a search interface through the discretized topographical graph, wherein the search interface provides a search function to search for locations visited by each entity represented in the discretized topographical graph.

10. A computer-implemented method comprising:
    generating, by a computing system, one or more datasets from geospatial data comprising a continuous stream of geospatial information;
    based on the one or more datasets, generating, by the computing system, a discretized topological graph comprising:
       location nodes indicating locations,
       entity nodes indicating entities, and
       edges between the location nodes and the entity nodes,
    determining respective first weights associated with a portion of the entities based on one or more types of the edges that are connected to each of the entity nodes corresponding to the portion of the entities;
    determining, by the computing system, respective second weights associated with a portion of the locations based on one or more types of the edges that are connected to each of the location nodes corresponding to the portion of the locations;
    based on non-geospatial information, changing, by the computing system, a first weight of the first weights or receiving a change to the first weight corresponding to a first entity of the entities, wherein the first entity visits a location having a second weight, and the non-geospatial information comprises an increase or a decrease in an authority level or a change in a designation of the first entity;
    reevaluating the second weight corresponding to the location based on the changed first weight, wherein, in response to the changed first weight being higher than the first weight, the reevaluated second weight is higher compared to the second weight; and
    ranking the entities or the locations based on the changed first weight or the reevaluated second weight.

11. The computer-implemented method of claim 10, wherein the first weights are associated with positions of the entities within an entity hierarchy.

12. The computer-implemented method of claim 10, wherein the second weights are further determined based on a total number of the edges connected to the location nodes corresponding to the locations over particular time intervals.

13. A non-transitory computer-readable storage medium storing instructions that, when executed by one or more processors of a computing system, cause the computing system to perform:
    generating one or more datasets from geospatial data comprising a continuous stream of geospatial information;

based on the one or more datasets, generating a discretized topological graph comprising:
  location nodes indicating locations,
  entity nodes indicating entities, and
  edges between the location nodes and the entity nodes,
determining respective first weights associated with a portion of the entities based on one or more types of the edges that are connected to each of the entity nodes corresponding to the portion of the entities;
determining respective second weights associated with a portion of the locations based on one or more types of the edges that are connected to each of the location nodes corresponding to the portion of the locations;
based on non-geospatial information, changing a first weight of the first weights or receiving a change to the first weight corresponding to a first entity of the entities, wherein the first entity visits a location having a second weight, and the non-geospatial information comprises an increase or a decrease in an authority level or a change in a designation of the first entity;
reevaluating the second weight corresponding to the location based on the changed first weight, wherein, in response to the changed first weight being higher than the first weight, the reevaluated second weight is higher compared to the second weight; and
ranking the entities or the locations based on the changed first weight or the reevaluated second weight.

14. The non-transitory computer-readable storage medium of claim 13, wherein the first weights are associated with positions of the entities within an entity hierarchy.

15. The non-transitory computer-readable storage medium of claim 13, wherein the second weights are further determined based on a total number of the edges connected to the location nodes corresponding to the locations over particular time intervals.

16. The system of claim 1, wherein the ranking of the entities or the locations is based on other first weights besides the first weight and other second weights besides the second weight.

17. The system of claim 1, wherein, if a change in the first weight is associated with an increase in a position of the entity relative to a hierarchy of entities, the reevaluated second weight increases relative to the second weight.

18. The system of claim 1, wherein the reevaluating of the second weight is based on a frequency of the first entity visiting the location.

* * * * *